(12) United States Patent
Srinivasan et al.

(10) Patent No.: US 8,915,744 B2
(45) Date of Patent: Dec. 23, 2014

(54) SYSTEM AND METHOD FOR AUTOMATED COMPETENCY ASSESSMENT

(75) Inventors: Raman Srinivasan, Chennai (IN); Priyadharshini Sridhar, Chennai (IN); Swarna Srinivasan, Chennai (IN); Rohit Kumar, Chennai (IN); Radhika Jayapaul, Chennai (IN); Radhika Ganesan, Chennai (IN); Amit Nath, Chennai (IN); Vikash Agarwal, Chennai (IN)

(73) Assignee: Tata Consultancy Services, Ltd., Mumbai (IN)

( * ) Notice: Subject to any disclaimer, the term of this patent is extended or adjusted under 35 U.S.C. 154(b) by 481 days.

(21) Appl. No.: 12/776,400

(22) Filed: May 9, 2010

(65) Prior Publication Data

US 2011/0111383 A1    May 12, 2011

(30) Foreign Application Priority Data

Nov. 6, 2009 (IN) .......................... 2574/MUM/2009

(51) Int. Cl.
*G09B 3/00* (2006.01)
*G09B 7/00* (2006.01)

(52) U.S. Cl.
CPC ....................................... *G09B 7/00* (2013.01)
USPC ......................................................... 434/322

(58) Field of Classification Search
USPC ............ 434/322, 323, 350–352, 362; 705/11; 707/104.1; 706/12
See application file for complete search history.

(56) References Cited

U.S. PATENT DOCUMENTS

| | | | | |
|---|---|---|---|---|
| 5,002,491 A | * | 3/1991 | Abrahamson et al. | 434/350 |
| 5,059,127 A | * | 10/1991 | Lewis et al. | 434/353 |
| 5,827,070 A | * | 10/1998 | Kershaw et al. | 434/322 |
| 7,257,557 B2 | * | 8/2007 | Hulick | 705/50 |
| 8,128,415 B2 | * | 3/2012 | Rogers et al. | 434/323 |
| 2002/0198766 A1 | * | 12/2002 | Magrino et al. | 705/11 |
| 2003/0129573 A1 | * | 7/2003 | Bowers et al. | 434/350 |
| 2005/0095571 A1 | * | 5/2005 | Miller | 434/350 |
| 2006/0014129 A1 | * | 1/2006 | Coleman et al. | 434/322 |
| 2007/0196808 A1 | * | 8/2007 | Call | 434/350 |
| 2009/0170058 A1 | * | 7/2009 | Walker et al. | 434/323 |

OTHER PUBLICATIONS

Lanscape_Product May 18, 2004 [WayBack Machine], [retrieved on Aug. 12, 2012], Retrieved from the Internet: URL<http://www.lanscapecorp.com/>.*

* cited by examiner

*Primary Examiner* — Robert J Utama
*Assistant Examiner* — Sadaruz Zaman
(74) *Attorney, Agent, or Firm* — Akerman LLP; Peter A. Chiabotti; Roy P. Zachariah (57) ABSTRACT

The present invention relates to a system used for competency assessment of candidates. More particularly the present invention relates to an automated system for talent acquisition in an enterprise to identify talented candidates who meet the qualification standards specified by enterprise using a secured and light weight method of providing content including questions and responses in a distributed architecture. The data center server of the system may connect to Knowledge center server to receive the secure test content. The test content is transferred to one or more exam center servers from the data center server. The exam center servers assess the competency of candidates connected to them via candidate console devices (computational devices), by generating unique and standardized test content for each candidate. The system enables less effort, time and consequently money, that multiple test administrators may spend traveling to different test locations to support the system infrastructure.

11 Claims, 5 Drawing Sheets

SYSTEM AND METHOD FOR AUTOMATED COMPETENCY ASSESSMENT

BACKGROUND

1. Field of the Invention

The disclosure generally relates a method and apparatus for an automated competency assessment system and a method thereof. More particularly the present invention relates to an automated system for talent acquisition in an enterprise to identify talented candidates who meet the qualification standards specified by enterprise using a secured and light weight method of providing content including questions and responses in a distributed architecture.

2. Description of Related Art

For many years standardized testing has been common method of assessing examinees for the purpose of education, job placements, skill evaluation etc. Due to cost and complexity of tests, computer based testing emerged as a superior method for providing standardized tests but administration of test and evaluation of test results dynamically at a large scale still pose variety of problems like redundancy of questions and lack of harmonization, analytics and scale up.

The need to effectively test and analyze the large pools of candidates for the purpose of talent acquisition or educational assessment has also been long recognized. With increasingly sophisticated workforces of correspondingly increasing accumulated value, the process of testing, analyzing and recruiting a workforce, with effective real-time analytics, can preserve and deliver substantial value to organizations, including employer enterprises and placement agencies.

Several inventions have been made in this domain some of them known to us are described below:

U.S. Pat. No. 7,437,309 describes a computer based human capital management system that collects information from any combination of position applicants, employees, and reserve pool talent reflective of the position skills, performance, and requirements thereof. In particular, the invention discloses a method for implementing a talent management system, executed on a computer system, providing for the collection and qualification of performance capability information of workforce candidates. The invention however relies on the information collected from the candidates and fails to present a system for secure administration of real-time assessment of candidates in a scalable way.

US Patent Application 20070185757 describe a method for performing Talent Relationship Management (TRM) of candidates. It uses target groups formed for specified purposes from candidates constituting a talent pool. In particular the invention discloses a method of identifying potentially suitable candidates based on stored and organized information sources for filling a vacancy in an organization. In one embodiment, this patent application proposes TRM in distributed computing environments. In another embodiment, it discloses a method that checks skill level and specialty, experience, geographical location of candidate, candidate's aptitude and interests. However, the invention fails to present a system for secure administration of real-time assessment of candidates at several locations in a scalable way.

An automated process for recruiting technicians and pre-certifying them for a job position in distributed over a number of different geographical locations e.g., franchises is disclosed in US Patent Application 20070192172. The process as described in the patent application is controlled from a main office or central station, at a computer or computer server that is connected with a global computer network such as the Internet. However, the invention fails to disclose a system that maintains security of process and transfer of data. The invention also fails to propose a method of assessment where no two candidates are given tests with same questions and yet the questions are of standardized difficulty level and also does not disclose a real-time analytics of the performance of the candidates.

US Patent Application 20020156674 describes a recruiting system and method for providing job offer information via a server connected to a network. is the invention proposes a skill information database for storing skill information concerning skilled people requiring jobs; and an aptitude level determiner for determining an aptitude level for a skill required for each job. The invention fails to disclose a method of secure and scalable test administration.

All the above-mentioned prior-arts fail to disclose a secure and scalable solution to automate the application of competency assessment by providing appropriate level of security to the process and data transfer. The prior art discussed above also fails to attempt the requirements of exclusivity and standardization of the assessment, wherein no two candidates are given tests with same questions and yet the question are of standardized difficulty level. There is also a "long felt need" to solve the vacuum of powerful and real-time analytics in this domain of knowledge assessment systems.

In order to solve the above problems this invention proposes an automated system for competency assessment to identify talented candidates, wherein the system is architected as a scalable, secure and light weight system, designed to operate over a distributed architecture, and provides secure content, including questions and responses, wherein the distinctiveness of the test is maintained and the analysis of the test results is supported at a near real time by powerful analytics engine.

Therefore, there is a need for a method and apparatus for an automated competency assessment tool.

SUMMARY

It is a primary object of the present invention to provide an automated system for competency assessment especially directed for talent acquisition in an enterprise to identify talented candidates who meet the qualifications standards specified by an enterprise.

It is another objective of the present invention to provide a distributed exam architecture wherein the architecture comprises of a centralized data centre and one or more exam centers distributed across multiple locations from where online test is administered on multiple candidate computing devices.

It is another objective of the present invention to provide a data centre comprising of a server system having means for storage, backup and network connectivity with appropriate software installed to centrally manage the entire process of providing distributed assessment and analytics solutions.

It is yet another object of the invention to provide a test set up consisting of a central data centre that sends secure, standardized test content to multiple exam centers where exam is conducted.

It is yet another object of the present invention to provide competency measurement services to an enterprise by offering service independently over the communication network in a secured way.

It is yet another objective of the present invention to provide security of content and results in order that they cannot leak and also cannot be tampered with, by applying AES and RSA algorithms.

It is yet another object of the present invention to provide a secured and lightweight method of providing data exchange including content, comprising of tests and responses and results in a distributed architecture.

It is yet another objective of the present invention to provide a flexible architecture based on a light-weight, standard XML document exchange format to enable incorporation through any technology.

It is yet another objective of the present invention wherein the software gets upgraded automatically on the exam centre if an authorized unique identity is matched with central data centre.

It is yet another objective of the present invention to provide a system to perform infrastructure due diligence at the test locations (exam centers).

It is yet another object of the invention that the test content communicated over the network is abstract and does not directly contain the questions as seen by the candidate.

It is yet another objective of the present invention to provide a method to enable standardized representation, creation, distribution and retrieval of content comprising tests and test questions.

It is yet another objective of the present invention to enable a discovery of specified skills and competencies in candidates by way of powerful real time analytics provided by central data centre server.

It is yet another objective of the present invention to provide a network environment connecting the said exam centre system to systems where the candidate takes the test.

It is yet another objective of the present invention to provide an exam centre which comprises of systems of appropriate software configured to enable the system to conduct tests across multiple candidate computing devices over a communication network.

It is yet another objective of the present invention to provide competency assessment test on personal computers, laptops, net books, mobile phones, digital paper or other computational devices.

It is yet another object of the present invention to conduct a test in a scalable way where many users can take the test at any given time such that no two users are given tests with the same questions and yet the tests are of standardized and controllable difficulty level.

It is yet another object of the invention that the content presented to the candidate is unknown until the time of the test.

It is yet another object of the invention that the scalability is achieved at the exam centre by managing the candidate load automatically through a mechanism of batching the users into configurable exam slots.

It is yet another object of the invention that the representation of content is made as software objects to maintain the security of the content throughout the life cycle of assessment.

It is yet another objective of the present invention to store the content in the RAM and is not physically retrievable from any storage device such as the hard disk at the exam centre.

It is yet another objective of the present invention to provide a backup of the content particularly test information and restoring the content automatically in case of power or network failures.

It is yet another objective of the present invention of the system to provide automated trails at multiple levels.

It is yet another objective of the present invention to provide a complete traceability of any single candidate's performance.

It is yet another objective of the present invention to create self-improving systems using analytics data.

It is yet another objective of the present invention to provide analytics on the data, performance of candidates across geographies, colleges and age cohorts. Also performance of the candidates over the test or parts thereof, concepts and domains can be viewed and analyzed.

It is yet another object of the present invention of the system to provide periodic identification of the questions that need to be eliminated or revised, from the knowledge centre upon analyzing the frequency of correct responses to a question.

It is yet another objective of the present invention to provide a report based on analyzed data of the test results at multiple levels of details for different stakeholders of the system.

It is yet another objective of the system is to support analysis and feedback through multiple models of psychometric test theory, such as classical test theory and item response theory.

It is yet another objective of the present invention to provide multiple offerings like the question bank content, online testing service, analytics and feedback of results which can independently offered as a solution or can be packaged in various combinations as a solution. Further, each of these offerings will independently evolve into other business offerings. For example the question bank content offering can evolve into a web-based education offering that will be used as a self-learning tutorial to learn, test knowledge and obtain real-time feedback on different functional domains of interest.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

Before the present methods and systems, are described, it is to be understood that this invention in not limited to the particular methodologies, systems and hardware described, as these may vary as per the person skilled in the art. It is also to be understood that the terminology used in the description is for the purpose of describing the particular versions or embodiments only, and is not intended to limit the scope of the present invention which will be limited only by the appended Claims.

One of the aspects of the present invention is to provide an automated system for talent acquisition in an enterprise to identify talented candidates who meet the qualifications standards specified by enterprise and more particularly, scalable, secure and light weight method of providing content including tests, questions and responses in a distributed architecture.

The invention has been designed to provide standardized test content to the candidates and is an end-to-end assessment solution to tap talent across any knowledge domain and any geographic location or age group.

The various components of the novel system as described in this invention comprise a knowledge kernel, a question content rendering engine, data centre and exam centre servers each connected synergistically to perform competency assessment in secure and scalable manner.

In particular, the system provides a secure setup and a method of transfer of content, such as the content for the test (question paper content) and the test result information, using AES encryption, RSA encryption and advanced compression techniques from the centralized locations to the distributed test centers and vice versa over the communication network.

The system as described in the present invention transfers the online test software and the online test content required to conduct the test over the communication network, to multiple exam centers where exams are conducted. The software is packaged as a readily deployable unit at the central data centre server for ready for consumption by one or more exam centre servers.

The test is stored as a lightweight encrypted XML document which is built to meet the requirement of each exam centre and readily available for the exam centre servers and can be decrypted at the exam centre locations.

With reference to the foregoing description, reference is hereby made to the following description and drawings that elaborate one embodiment of the present invention. The said description and drawings are for illustration purpose only and do not limit the scope of the present invention or the manner in which it is performed.

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

One of the aspects of the present invention is to provide an automated system for talent acquisition in an enterprise to identify talented candidates who meet the qualifications standards specified by enterprise and more particularly, scalable, secure and light weight method of providing content including questions and responses in a distributed architecture.

The invention has been designed to provide a system for standardized test content to the candidates and is an end-to-end assessment solution to tap talent across any functional domain and any geographic location or age group.

The present invention has four primary components. The Exam Centre server that is designed to provide the software infrastructure required to conduct distributed online assessment with a provision to perform regular communication with the central Data Centre server to ensure secure and streamlined services, LanScape component and secure exam centre installer. The various components of the novel system as described in this invention, including data centre and exam centre are connected synergistically to perform competency assessment in secure and scalable manner.

Exam Centre Server

The exam centre server further comprises Authentication manager, configuration manager, online test manager, candidate profile manager, slot manager, backup and restore manager and result manager.

Authentication Manager: The authentication manager is responsible for validating user access to exam centre server, authentication of regular communication with the central data centre server for software configuration, result sharing, result publication, candidate authentication. The user access can be validated upon entering a user authentication code or a password optionally coupled with an image verification code.

Configuration manager: A customer can configure system to conduct drives/tests. He provides the following information, question paper authentication ID, base location, drive location, no. of candidates, drive date, excel upload of user list.

Candidate profile manager: This component manages the profiles of the registered candidates, aggregating their feedback and information associated with the candidates.

Slot Manager: Slots are automatically assigned to candidates at the commencement of the test.

Online test manger: This component manages the generation of standardized test content for each candidate and tracking test information for all the candidates.

Result Manager: This component manages the aggregation of online test information of all the candidates for each exam slot and generation of results data for each slot.

Data Centre Server

The data centre server component is a customer relationship management component which consists of a user manager, a request manager, an online test content manager, skill manager and a test results manager component.

The data centre server hosts and manages technology and content infrastructure required to offer over a communication network; the data centre server has a security centre that maintains across customer and user bases a role base authentication for information access.

The data centre server is also designed to manage Digital infrastructure required for managing customer information, servicing requests; customer owned test content and Information dashboard. Finally the data centre server provides feedback of content usage by customers.

LanScape

The present invention provides automated tools to perform due-diligence in a multiple distributed and geographically dispersed exam centers to ensure smooth conduct of exam. Because test administrators may spend time and consequently money traveling to different test locations in search for talent, it is important that the system is failure proof. The administrators can hence perform a remote, automatic check on the test system and associated infrastructure to ensure smooth conduct of the exam through LanScape Component.

LanScape component is a computer program that automates validation for software/hardware and network connectivity prerequisite at the Exam Centre. This component ensures a smooth process of communication between data centre server and the exam centre server, without any chances for disruptions.

The purpose of LanScape is threefold in this invention it Checks Software and Hardware compatibility of the exam centre server, secondly it also Checks candidate machines for required software and hardware, thirdly it generates and share result with data centre server.

Secure Exam Centre Installer

Secure exam centre installer provides an automated method to Transfer online test software required to conduct the test over the communication network, to a multiple exam centers where exams are conducted. The software is packaged as a readily deployable unit at the central data centre for ready for consumption by the exam centers.

The invention enables Central data centre server to create secure authentication information for the exam centers to automate online test software installation at the exam centre over the communication network based on successful authentication by the data centre server.

In a preferred embodiment the test setup according to the invention primarily consists of a central data centre which sends online test software and the online test content required to conduct the test over the communication network, to multiple exam centers where exams are conducted, to automate online test software installation and online test configuration at the exam centre over the communication network based on successful authentication by the data centre server.

In a further embodiment the software is packaged as a readily deployable unit at the central data centre ready for consumption by the exam centers.

In another embodiment of the invention the test is stored as a light-weight encrypted XML document which is built to meet the requirement of each exam centre and readily available for the exam centers and can be decrypted at the exam centre.

a. In a typical scenario the system will conduct scalable and secure assessment of knowledge in the following manner: Central data centre server creates secure authentication information for the exam centers to automate online test software installation at one or more exam centre servers and automates online test configuration at one or more exam centre server over the communication network based on successful authentication by the data centre server.

b. data centre server is configured to obtain assessor input content defining the required knowledge level to be tested.

c. One or more exam centre servers connect to the central data centre server to receive the online test software bundle for automatic installation over the communication network on successful authentication by the data centre server.

d. One or more exam centre servers connect to the central data centre server to receive the encrypted and secure online test content over the communication network based on successful authentication by the data centre server.

e. Each exam centre decrypts the online test content and generates the standardized question paper unique for each candidate system.

f. Each exam centre server returns the consolidated test results for all the candidates in an exam slot in an encrypted and compressed format using advanced encryption and compression techniques to the centralized data centre over the network.

g. Central data centre server analyzes the test results data for performance tracking of candidates by the data centre server.

h. Central data centre server improves the quality of the content from the analysis of the response data.

The invention thus enables:

a. One or more exam centre servers to connect to the central data centre server to receive the online test software bundle for automatic installation over the communication network on successful authentication by the data centre server.

b. One or more exam centre server to connect to the central data centre server to receive the encrypted and secure online test content over the communication network based on successful authentication by the data centre server c One or more candidates to take the exam from exam centers by connecting to the exam centre server simultaneously over the communication network.

The scalability and load management at the exam centre server is achieved through an innovative batching mechanism that groups candidates automatically into small batches called slots. Batching also aids in making the testing process and the results generation process a continuous and efficient assembly line activity, facilitating the option of sharing test information with the central data centre server as small packets of encrypted information, and generating results from the central data centre server instantaneously.

The invention enables the method of:

a. Obtaining assessor input defining the required knowledge level to be tested b. Definition of smart test questions to assess definition set of skills c. categorization of questions at multiple levels of abstraction d. assembling and representation of questions to form online test content based on the assessor input Online test content received from the central data centre is decrypted at the exam centre to generate a standardized question paper for each candidate. The tests at each candidate system are synchronized with the exam centre server.

In particular, the system provides a secure setup and a method of transfer of test information, such as the content for the test (question paper content) and the test result information, using AES encryption, RSA encryption and advanced compression techniques from the centralized locations to the distributed test centers and vice versa over the communication network.

The test and feedback information is consolidated for each candidate at the exam centre server and securely transferred to the central data centre server for result generation.

In one embodiment of the invention the online test content is stored in 'RAM' in the form of objects and not persisted in a database and is not physically retrievable from any storage device such as the hard disk at the exam centre.

The invention enables the prevention of the loss of test content through a backup and restore mechanism that consolidates and backs up data stored in the 'RAM' in situations of network or power failures and restores the data back on restoration of network/power and aids in resuming the test without any errors.

The Invention further enables the consolidation of test results for each completed exam slot and generates the results of the test conducted with help of the system as described which is instantaneous and secure. The results are stored in encrypted format and can only be decrypted at a centralized location from where the results are generated and sent back to the test locations if required. The exam centre is configured to provide automated trails at multiple levels.

In another embodiment of the invention the data centre server comprises a powerful analytics engine that provides:

a. analytics on the data, performance of candidates across geographies, colleges and age cohorts b. performances analytics of the candidates over the question paper, questions, concepts and domains can be viewed c. a complete traceability of any single candidate's performance in near real time d. feedback and a self-improvement loop on the content, which enable the system to adapt to new standards and prevent redundancy of the content e. analytics and feedback by supporting multiple models of psychometric test theory, such as classical test theory and item response theory Another aspect of the invention provides a bundle of assessment services accessible over the communication network to provide secure, digitized testing and hiring solutions. Customers may use either the complete system or modules, through the data centre. The knowledge Centre is a secure and intelligent source of questions, wherein questions are categorized and organized by concepts, skills and domains. Questions generated by the Knowledge centre are packaged into a question paper that enables selection of candidates with a certain desired skills or set of skills.

Figure 1:
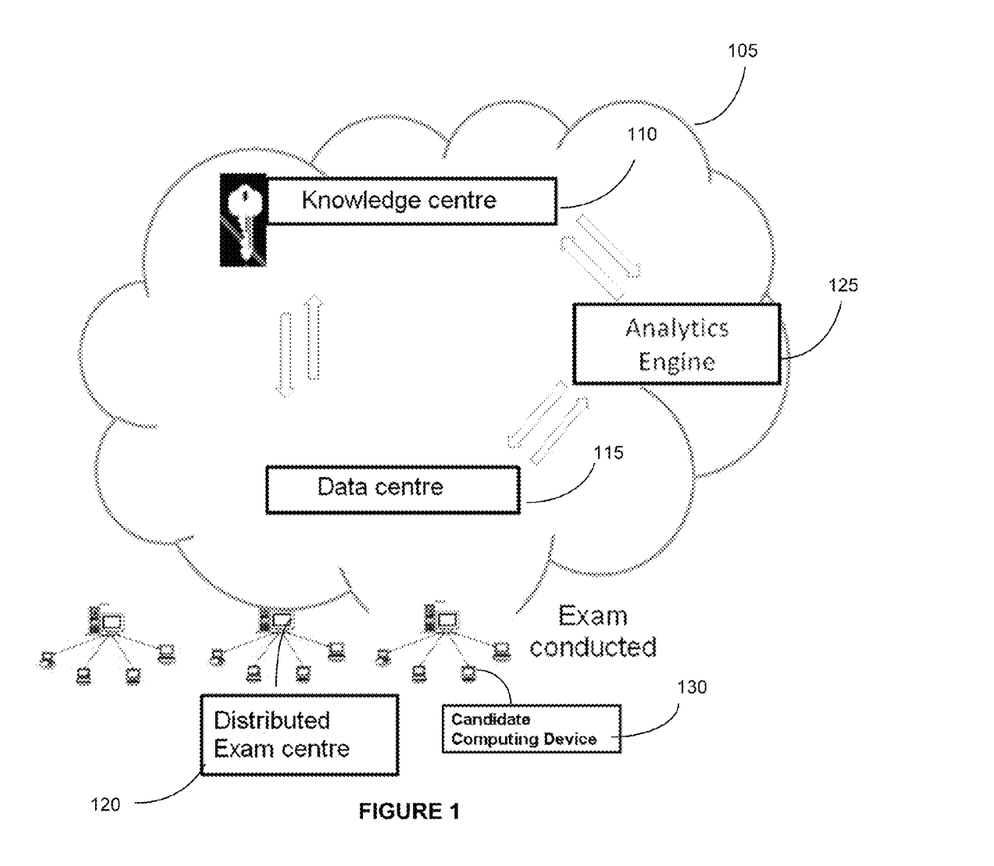
FIG. 1 is a block diagram of the system comprising of different components to automate the assessment or recruitment process in an enterprise.
Figure 2:
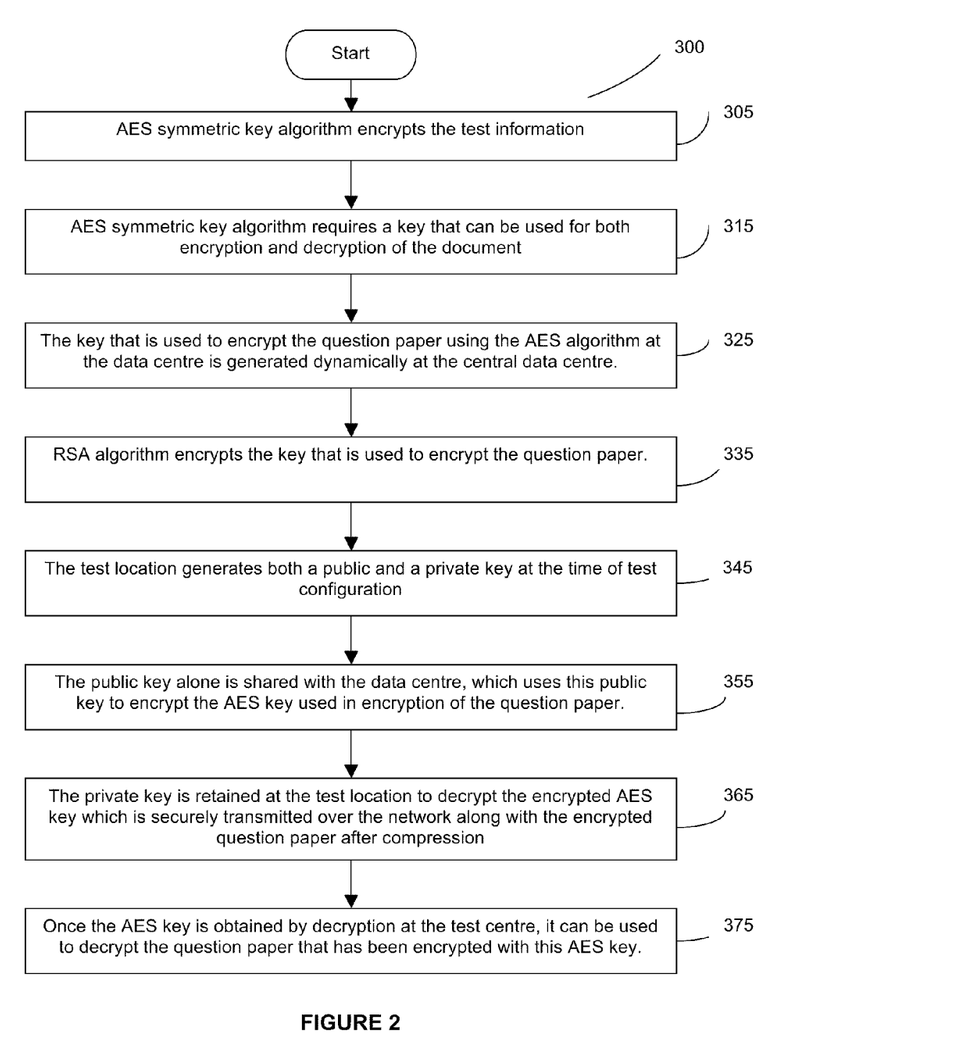
FIG. 2 is a flow diagram of implementation of data security by encryption and decryption of the test paper results and other information.

FIG. 1 is a block diagram of the system comprising of different components to automate the assessment or recruitment process in an enterprise according to one embodiment of the invention wherein the system (105) provides scalable, secure assessment of knowledge to one or computer candidates (130) comprising a data centre (115), a knowledge centre server (110), an exemplary exam centre server (120) and an analytics engine (125) wherein:

the data centre server (115) is a centralized control to remotely manage and moderate the assessment or recruitment process in an enterprise.

the knowledge centre server (110) component consists of a secure interface to assemble and represent standardized questions the exam centre server (120) consists of a decentralized system for conducting tests at multiple locations in a secure manner and sending the encrypted test information to the data centre server.

the analytics engine (125) provides analytics on the data, performance of candidates FIG. 2 is a flow chart illustrating how the encryption and decryption of the test paper and results can be done.

In an embodiment of the Invention the present Invention is a secured method of providing content including questions and responses in a distributed architecture. In the step (305), an advanced encryption standard (AES)(www.aes.com) symmetric key algorithm encrypts the test information to provide a security to test contents. In the step (315), advanced encryption standard (AES) symmetric key algorithm requires a key that can be used for both encryption and decryption of the information. In the step (325), the key which is used to encrypt the question paper using the AES algorithm at the data centre is generated dynamically at the data centre. In the step (335), for giving one more level of security, RSA (Rivest, Shamir and Adleman)(www.rsa.com) algorithm applies to encrypt the key that is used to encrypt the question paper. Then, in next step (345), the test location generates both public and private key at the time of test configuration. The public key alone is shared with the data centre, which uses this public key to encrypt the AES key used in encryption of the question paper is shown in (355), whereas the private key is retained at the test location to decrypt the encrypted AES key which is securely transmitted over the network along with the question paper after compression. In next step (375), after getting the AES key by decryption at the test centre, it can be used to decrypt the question paper that has been encrypted with the AES key.

Figure 3:
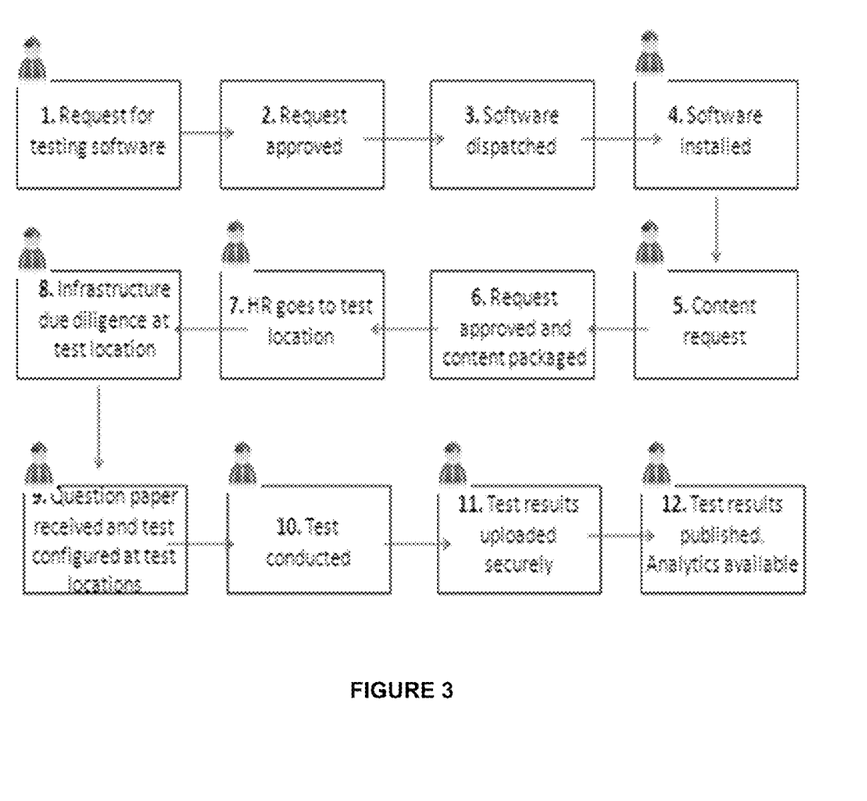
FIG. 3 is an illustration of workflow of an exemplary application of the invention.

FIG. 3 is an illustration of workflow of an exemplary application of the invention.

The Human Resource manager requests for testing services to conduct competency assessment (1). The request is approved by the service manager installation (2). The software is dispatched to the Human Resource manager (3). The software is installed upon successful (4) The Human Resource manager can request for the contents from the data centre (5). On approval, questions are packaged into an encrypted question paper through Advanced Encryption Standard (AES) algorithm (6). The computational devices can then be taken to the site of the test where automatic infrastructure and software compliance is undertaken (8). On the day of the exam, the test is configured by connecting to the Data Centre, from where the encrypted question paper is received upon authentication (9). The test is then taken one or more candidates (10). On completion of the test, the encrypted results are uploaded to the data centre where they are stored and published (11). Analytics of the test results are available real time (12).

Figure 4:
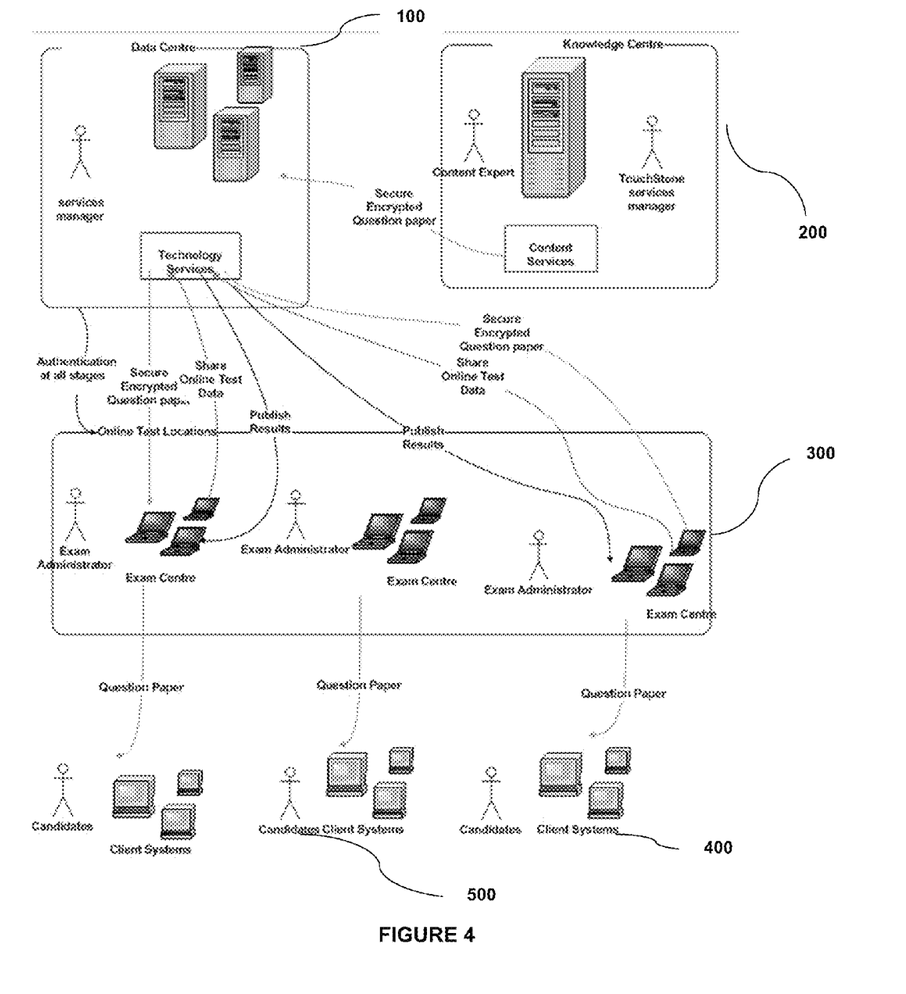
FIG. 4 is an illustration of the system architecture as per the present invention.

FIG. 4 is an illustration of the system architecture as per the present invention.

The component (100) represents the data centre server which is connected over the network with the knowledge centre and various exam centre servers. The data centre provides the technology services including secure encrypted question paper to the Exam centre upon authentication. The component (200) refers to the Knowledge centre server managed by one or more content services expert, the knowledge centre server is configured to communicate to the data centre server over the communication network. The component (300) of the illustration refers to the Exam centre component connected to candidate computers and configured to share content, including authentication data, question paper data, online test data and result data with data centre server. Exam centre server(s) also communicate the question papers to various candidate computing devices. The component (400) and (500) refer to client systems and candidates respectively that take the test over the communication network.

Figure 5:
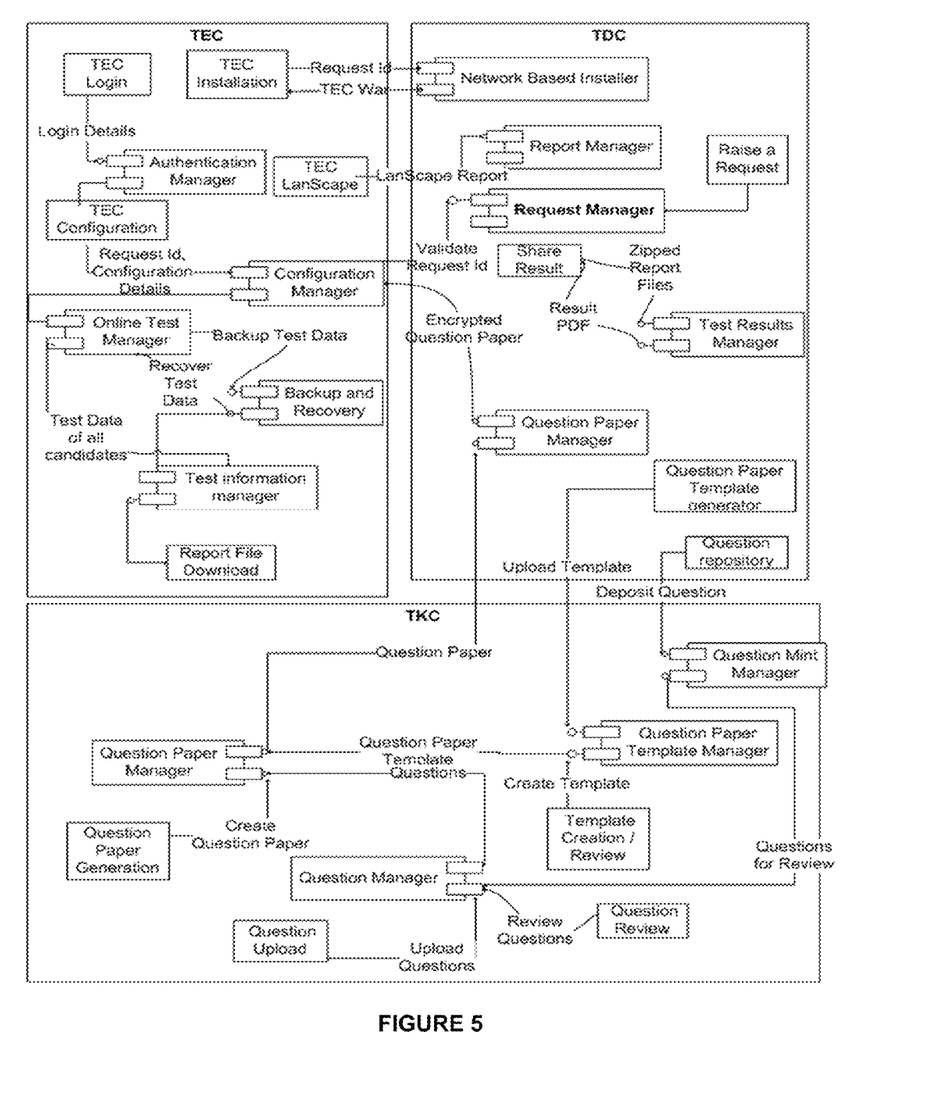
FIG. 5 is a flowchart of the workflow of amongst Data Centre, Knowledge Centre and Exam Centre.

FIG. 5 is a flowchart of the workflow of amongst Data Centre, Knowledge Centre and Exam Centre based on the system architecture of the present invention.

According to one embodiment of the invention, provides a bundle of assessment services accessible over the communication network to provide secure, digitized testing and hiring solutions. Customers may use either the complete system or modules, through the data centre. According to one embodiment of the invention, the knowledge Centre server is a secure and intelligent source of questions, wherein questions are categorized and organized by concepts, skills and domains. Questions generated by the Knowledge centre are packaged into a question paper that enables selection of candidates with a certain desired skills or set of skills.

According to one embodiment of the invention to conduct a test in a scalable way where many users can take the exams at any given time such that no two users are given tests with the same questions and yet the tests are of standardized difficulty level. This is because the architecture is such that the load of the candidates taking tests is distributed across local servers called the Exam Centers. Also, there is no database residing on the Exam Centre. The Exam Centre interacts directly with the data centre to receive an encrypted, abstract question paper which it later renders into multiple candidate consoles taking the exam.

Also, the test is in abstract form, therefore the question paper presented to the candidate is unknown until the exam results the time of the test. This ensures security against question leaks. Similarly results are also securely compressed, encrypted and then transmitted. Hence, tampering of the results is impossible.

It is required by large organizations and educational institutes to have common entrance tests for a large number of candidates across multiple locations. It is hence required that the tests presented to the candidates be standardized and of uniform or identical difficulty levels. However, the system is also required to discourage candidates from copying solutions to test problems from a neighboring test taker. Hence the mechanism of problem formulation and test creation is such that it discourages candidates from even attempting to copy or share solutions to problems either during the test or after it and also ensures that the test is standardized.

According to one embodiment of the invention, an online test data is stored in the form of java objects in the memory. These objects can be serialized and stored as flat files during the back-up process. The idea of storing the data in the form of an object and not database is because the database requires space and maintenance. On the other hand, use of a persistent database would cause the application to be heavy, and would require trained personnel to setup and administer the database. To create a fair testing process where tests can be backed up in case of failures such as network interruption or power failure and these tests can be resumed without loss of data. In many cities across India, power failure is a natural and frequently occurring phenomenon. Hence the test requires mechanisms to ensure that a candidate's test state is saved and can be restored in the event of such a failure.

According to one embodiment of the invention, the system uses compression methods provided by Java. These compression techniques work by scanning text, replacing and indexing repeating strings, thereby reducing file size. In our present invention, the document is in XML format. XML documents contain noise, which are repeating and long tags, that provide syntax and semantic structure to the data. This compression noise can further be reduced by reducing the size of the tags and indexing them. This, along with a standard compression technique works effectively, particularly in situations where file upload and download have to take place within a relatively short period of time.

According to another embodiment of the invention, the analytics engine performs various functions by gathering information from calibration and live tests. It performs predictive hiring, provides valuable feedback to the question bank and properties and also provides us with meta-cognitive indicators of the crowd. It helps perform social, demographic, location-based and temporal analysis on the population. Also, the system provides powerful analytics at multiple levels to the various stakeholders of the system.

According to one embodiment of the invention, the system's services can be provided on net books, mobile phones, digital paper and other computational devices. Since organizations need to spot and nurture talent from hitherto unfamiliar talent pools, they require administrators to travel to remote locations and administer tests under strange and unfamiliar conditions. Various forms of test administering methods are hence required, that are mobile, low-cost, easy-to-use and failure-proof. Hence different forms of test taking solutions are provided. For example, if the location does not have a network and computer infrastructure, the test administrator can conduct the exam on a digital pen and paper or even a mobile handheld.

According to one embodiment of the invention, the system provides services that consist of multiple offerings like the question bank content, online testing service, analytics and feedback of results which can independently offered as a solution or can be packaged in various combinations as a solution. Each of these offerings will independently evolve into other business offerings. For example the question bank content offering can evolve into a web-based education offering that will be used as a self-learning tutorial to learn, test knowledge and obtain real-time feedback on different functional domains of interest.

The system is self-learning in the manner that it learns and reacts by analyzing the test content data and results. It provides periodic identification of the questions which need to be eliminated from the knowledge centre upon receiving the number of correct responses to the question has sharply increased on the feedback data.

According to one embodiment of the invention, the system inherently ensures process compliance with complete audit and traceability of processed to responses in every single question. There are checks at every point in the process. Therefore, it ensures a fair, auditable and traceable test process.

It is yet another objective of the present invention to provide multiple offerings like the question bank content, online testing service, analytics and feedback of results which can independently offered as a solution or can be packaged in various combinations as a solution. Further, each of these offerings will independently evolve into other business offerings. For example the question bank content offering can evolve into a web-based education offering that will be used as a self-learning tutorial to learn, test knowledge and obtain real-time feedback on different functional domains of interest.

The invention is described in the example given below which is provided only to illustrate the invention and therefore should not be construed to limit the scope of the invention.

An organization XYZ wants to hire 20,000 candidates in a recruitment drive that has to be carried out in 400 locations on a single day wherein more than half a million candidates have to appear. The organization wants to conduct a harmonized aptitude test for making hiring decisions.

In normal circumstances the organization will have to mobilize huge human resources to compile, supervise, undertake and analyze such an operation. Where as according to the present invention, the data centre server will first obtain a user input defining the required knowledge level to be tested and domain of the test from the recruiter. In the next step the system at each distributed exam centre will request software and data for conducting competency assessment from the data centre. Upon successful authentication, the software is installed in the distributed exam centers. In the following step, the LanScape component of the system will confirm the infrastructure, network and software availability at each test location required for conducting test securely with the help of computer program. In the next step, the test is configured at the Exam centre server by connecting to the Data Centre server, from where the encrypted online test content is received on successful authentication. Exam centre server decrypts the online test content and sends unique and standardized question paper to each candidate computational device. On completion of the test by candidates the results are aggregated, compressed, encrypted and shared with the central data centre server where they are stored and published for analysis.

Finally, the management team can generate a report on analyzed test result data. In this way by providing scalable, secured and distributed exam architecture, the management team hires the talented candidates across geographies, colleges and age cohorts who meet the qualification standard specified by the organization.

Below are some exemplary advantages of the current invention over current methods and systems:

a. The system provides end-to-end assessment solution for talent acquisition to identify talented candidates who meets the qualification standards specified by clients.
 b. The system comprises network of hardware arranged in a manner to implement a method to automate the large scale and secure assessment or recruitment process
 c. The system provides secure and light-weight method of providing technology and assessment content including online test technology and questions and responses in a distributed architecture
 d. The system provides automated tools to perform due-diligence in a multiple distributed, geographically dispersed exam centre for ensuring presence of the required software, hardware infrastructure and the stability of the candidate computing device and its configuration, the network infrastructure and bandwidth required.
 e. The system enables less effort, time and consequently money, that multiple test administrators may spend traveling to different test locations to support the system infrastructure.
 f. The system provides near real time analytics of the test results.
 g. Overall the system ensures Failure-proof administration of the test ensuring smooth conduct of the exam.

While the principles of the disclosure have been illustrated in relation to the exemplary embodiments shown herein, the principles of the disclosure are not limited thereto and include any modification, variation or permutation thereof.

What is claimed is:

1. A system for providing dynamic scalability to a plurality of distributed exam center servers, the system comprising:
 a knowledge center server that stores a plurality of questions in one or more categories;
 an analytics engine, operably coupled to the knowledge center, that derives performance metrics for the plurality questions;
 a centralized data center server coupled to the analytics engine, wherein the centralized data center server:
  sends online test content to the plurality of distributed exam center servers in order to conduct a test,
  receives results corresponding to the test in encrypted form from the plurality of distributed exam center servers,
  wherein the plurality of distributed exam center servers are communicatively coupled to the centralized data center server, wherein the centralized data center server remotely accesses each distributed exam center server for continuous infrastructure data gathering from the plurality of distributed exam center servers to further ensure a smooth communication between the centralized data center server and each distributed exam center server, and
 wherein each distributed exam center server manages a load of a plurality of requests for a test from a plurality of candidates through a batching mechanism that groups the plurality of candidates automatically into one or more batches.

2. The system of claim 1, wherein the centralized data center server is configured to provide a planning, execution and monitoring interface for large scale geographically distributed examination delivery in order to ensure a smooth exam delivery process.

3. The system of claim 1, wherein the knowledge center is configured to form a standardized test content from the plurality of questions stored therein, and the standardized test content is stored in the centralized data center server.

4. The system of claim 1, wherein the distributed exam center server is configured to provide a secure interface for displaying a standardized and unique test to a candidate system.

5. The system of claim 1, wherein the distributed exam center server is configured to receive an input related to a unique test from the central data center server.

6. The system of claim 1, wherein the analytics engine is configured to analyze the distributed exam center operational information to remotely monitor the progress of exam delivery.

7. The system of claim 1, wherein gathered infrastructure data is further analyzed to configure a exam delivery process.

8. A system for generating and administering a test, the system comprising:
 a centralized data center server that sends a test software and a test content in a standardized form required to conduct the test over a communication network to one or more distributed exam centers;
 a distributed exam center server communicatively coupled to the centralized data center server over the communication network, wherein the distributed exam center server on successful authentication receives the test content in the standardized form, wherein the successful authentication further provides a verification of software and hardware infrastructure;
  wherein the distributed exam center server generates a unique and standardized test from the test content at each candidate system of an exam center;
  wherein the distributed exam center server manages a load of requests for a test from a plurality of users through a batching mechanism that groups the users automatically into one or more batches; and
  wherein the distributed exam center server is further provided with a dynamic memory to store the test content in the form of objects;
 an encryption engine coupled to the centralized data center server, wherein the encryption engine encrypts the test content before the test content is transmitted to the distributed exam center server from the centralized data center server;
 a decryption engine coupled to the distributed exam center server, wherein the decryption engine decrypts the test content on verification of authentic user access, after the test content is transmitted to the distributed exam center server from the centralized data center server; and
 an analytics engine coupled to the centralized data center server, wherein the analytics engine analyzes results of the test.

9. The system of claim 8, wherein the centralized data center server is configured to obtain an assessor input defining a required knowledge level to be tested.

10. The system of claim 8, wherein the distributed exam center server on receiving a request for a test from the user, generates a group of unique questions from the test questions received from the centralized data center server.

11. The system of claim 8, wherein the analytics engine analyzes results of the test questions to create and publish information analytics.

* * * * *